US007254619B2

(12) United States Patent
Mekata et al.

(10) Patent No.: US 7,254,619 B2
(45) Date of Patent: Aug. 7, 2007

(54) APPARATUS FOR OUTPUTTING INDIVIDUAL AUTHENTICATION INFORMATION CONNECTABLE TO A PLURALITY OF TERMINALS THROUGH A NETWORK

(75) Inventors: Tsuyoshi Mekata, Osaka (JP); Kenya Uomori, Osaka (JP); Shin Yamada, Kanagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 645 days.

(21) Appl. No.: 09/972,820

(22) Filed: Oct. 5, 2001

(65) Prior Publication Data

US 2002/0073213 A1    Jun. 13, 2002

(30) Foreign Application Priority Data

Oct. 13, 2000    (JP) ............................. 2000-313154

(51) Int. Cl.
G06F 15/16    (2006.01)
G06F 7/00    (2006.01)
G06F 17/00    (2006.01)
H04L 9/32    (2006.01)

(52) U.S. Cl. ....................... 709/217; 707/104.1; 726/7; 726/19

(58) Field of Classification Search ................ 713/155, 713/157, 159, 168, 172, 179, 182–186; 707/9, 707/104.1; 705/65, 18, 77; 709/244, 245, 709/217–219, 225, 227–229; 704/273; 726/2–10, 726/27–8, 19; 380/227; 340/5.52, 5.82; 382/115–127
See application file for complete search history.

(56) References Cited

U.S. PATENT DOCUMENTS 5,481,720 A * 1/1996 Loucks et al. ............... 713/201

(Continued)

FOREIGN PATENT DOCUMENTS

EP        0 717 339 A2    6/1996

(Continued)

OTHER PUBLICATIONS

European Search Report, Application No. EP 01 12 3337, dated Mar. 7, 2003.

(Continued)

*Primary Examiner*—David Wiley
*Assistant Examiner*—Joseph E. Avellino
(74) *Attorney, Agent, or Firm*—Renner, Otto, Boisselle and Sklar, LLP (57) ABSTRACT

An individual authentication information output apparatus, connectable to a plurality of information processing systems through a network, includes an input section for receiving an input from a user; an individual authentication section for outputting an individual authentication result of the user based on the input from the user; a specification section for specifying at least an information processing system selected by the user among the plurality of information processing systems; a database for managing individual authentication information in association with the individual authentication result provided by the individual authentication section and a specification result provided by the specification section; and a database access section for, based on the individual authentication result provided by the individual authentication section and the specification result provided by the specification section, reading the individual authentication information associated therewith, and outputting the read individual authentication information to the selected information processing system through the network.

15 Claims, 7 Drawing Sheets

U.S. PATENT DOCUMENTS

| | | | | |
|---|---|---|---|---|
| 5,818,936 A | * | 10/1998 | Mashayekhi | 713/167 |
| 5,825,871 A | * | 10/1998 | Mark | 379/357.03 |
| 5,838,812 A | * | 11/1998 | Pare et al. | 382/115 |
| 5,930,804 A | * | 7/1999 | Yu et al. | 707/104.1 |
| 5,963,908 A | | 10/1999 | Chadha | 704/273 |
| 6,006,333 A | * | 12/1999 | Nielsen | 713/202 |
| 6,018,739 A | * | 1/2000 | McCoy et al. | 707/102 |
| 6,140,939 A | * | 10/2000 | Flick | 340/825.69 |
| 6,141,760 A | * | 10/2000 | Abadi et al. | 713/184 |
| 6,219,790 B1 | * | 4/2001 | Lloyd et al. | 713/201 |
| 6,256,737 B1 | * | 7/2001 | Bianco et al. | 713/186 |
| 6,269,348 B1 | * | 7/2001 | Pare et al. | 705/39 |
| 6,317,783 B1 | * | 11/2001 | Freishtat et al. | 709/218 |
| 6,446,210 B1 | * | 9/2002 | Borza | 726/4 |
| 6,507,912 B1 | * | 1/2003 | Matyas et al. | 382/115 |
| 6,587,836 B1 | * | 7/2003 | Ahlberg et al. | 705/26 |
| 6,636,973 B1 | * | 10/2003 | Novoa et al. | 726/20 |
| 6,657,538 B1 | * | 12/2003 | Ritter | 340/5.81 |
| 6,697,947 B1 | * | 2/2004 | Matyas et al. | 713/182 |
| 6,732,278 B2 | * | 5/2004 | Baird et al. | 726/7 |
| 6,738,815 B1 | * | 5/2004 | Willis et al. | 709/225 |
| 6,751,734 B1 | * | 6/2004 | Uchida | 713/186 |
| 6,775,776 B1 | * | 8/2004 | Vogt et al. | 713/186 |
| 6,816,970 B2 | * | 11/2004 | Morgan et al. | 713/183 |
| 6,848,050 B1 | * | 1/2005 | Merman et al. | 713/171 |
| 6,850,916 B1 | * | 2/2005 | Wang | 705/64 |
| 6,877,097 B2 | * | 4/2005 | Hamid et al. | 713/186 |
| 6,931,538 B1 | * | 8/2005 | Sawaguchi | 713/186 |
| 2001/0001876 A1 | * | 5/2001 | Morgan et al. | 713/171 |
| 2001/0037451 A1 | * | 11/2001 | Bhagavatula et al. | 713/155 |
| 2001/0039533 A1 | * | 11/2001 | Pare et al. | 705/39 |
| 2003/0006277 A1 | * | 1/2003 | Maskatiya et al. | 235/379 |
| 2003/0046083 A1 | * | 3/2003 | Devinney et al. | 704/273 |
| 2003/0195935 A1 | * | 10/2003 | Leeper | 709/206 |
| 2004/0044627 A1 | * | 3/2004 | Russell et al. | 705/50 |
| 2005/0005135 A1 | * | 1/2005 | Chen et al. | 713/185 |
| 2006/0056662 A1 | * | 3/2006 | Thieme et al. | 382/115 |

FOREIGN PATENT DOCUMENTS

EP   0 863 491 A1   9/1998

OTHER PUBLICATIONS

Enterprise Connectivity Solutions, Inc.; "Enterprise Single Logon Product Description"; Internet; Oct. 19, 1996.

* cited by examiner

APPARATUS FOR OUTPUTTING INDIVIDUAL AUTHENTICATION INFORMATION CONNECTABLE TO A PLURALITY OF TERMINALS THROUGH A NETWORK

BACKGROUND OF THE INVENTION

1. Field of the Invention

The present invention relates to an apparatus for outputting individual authentication information (individual authentication information output apparatus) connectable to a plurality of information processing systems through a network.

2. Description of the Related Art

Conventionally, systems for performing business transactions, such as product purchases and use of paid information services, using cellular phones are known. In order to perform a business transaction, it is necessary to connect a cellular phone to a network provider through a base station and then to a company, such as a supplier or a customer, through the network.

In order to connect a cellular phone to a network provider, the user typically needs to input his/her password to the cellular phone. Even after the cellular phone is connected to the network provider, the user is often requested to input his/her password each time he/she attempts to use a service provided by the network provider (for example, reading of mails or mediation for connection to a business connection). The user cannot always use the same password for all these services. Different services provided by the network provider may require a different number of characters for a password.

In order to perform business transactions with a plurality of business connections, it is typically necessary to set a different password for each business transaction or for each service provided by the same business connection. The reason for this is because the number of characters required for a password is often different depending on the business connection.

The user needs to set different passwords for using a plurality of services provided by a network provider or for performing business transactions with a plurality of business connections. It is difficult for the user to manage all the passwords comprehensively.

It is conceivable to reduce the number of characters of passwords so that all the passwords are formed of the same character string in order to allow the user to manage his/her passwords more easily. However, a password of only about four characters can be easily stolen by people in close vicinity of the user when he/she performs a business transaction in public, and subsequently misused. Conversely, a password of a larger number of characters is difficult for the user to remember.

One objective of the present invention is to provide an individual authentication information output apparatus for easily managing passwords without causing the user to be concerned about a great number of passwords even when there are a great number of business connections.

Individual authentication systems for authenticating an individual using biometric information such as, for example, a fingerprint or an iris instead of a password (character or symbol code string) have been developed (see, for example, Japanese Laid-Open Publication No. 11-53317). Such systems provide a significantly lower probability of incorrect authentication as compared to an individual authentication system based on a password, and therefore are expected to be used more widely.

However, where different individual authentication systems are used for different business connections, it is necessary to construct an information system or change an existing information system so that a plurality of individual authentication systems can be handled by a cellular phone or a business connection. Conceivable information systems are, for example, (1) mounting a plurality of individual authentication systems on each cellular phone, (2) the user carrying a plurality of cellular phones each having a single individual authentication system mounted thereon, and (3) constructing an information system so that each business connection can handle a plurality of individual authentication systems. Information system (1) increases the cost of the cellular phone, information system (2) is inconvenient to the user, and information system (3) causes the business connection to increase the cost. None of the results are favorable.

Another objective of the present invention is to provide an individual authentication information output apparatus capable of handling a plurality of individual authentication systems.

SUMMARY OF THE INVENTION

According to one aspect of the invention, an individual authentication information output apparatus connectable to a plurality of information processing systems through a network includes an input section for receiving an input from a user; an individual authentication section for outputting an individual authentication result of the user based on the input from the user; a specification section for specifying at least an information processing system selected by the user among the plurality of information processing systems; a database for managing individual authentication information in association with the individual authentication result provided by the individual authentication section and a specification result provided by the specification section; and a database access section for, based on the individual authentication result provided by the individual authentication section and the specification result provided by the specification section, reading the individual authentication information associated therewith, and outputting the read individual authentication information to the selected information processing system through the network.

In one embodiment of the invention, the specification section further specifies a service selected by the user among a plurality of services provided by the information processing system selected by the user, In one embodiment of the invention, the individual authentication information is either one of a password, biometric information and pseudo biometric information.

In one embodiment of the invention, the input from the user is biometric information representing at least one of fingerprint, face, retina, iris, handprint, voice and handwriting.

According to another aspect of the invention, an individual authentication information output apparatus connectable to a plurality of terminals and a plurality of information processing systems through a network is provided. The plurality of terminals include a first terminal having a first input section for receiving a first type input from the user and a second terminal having a second input section for receiving a second type input, which is different from the first type input, from a user. The first type input and the second type input are provided to the individual authentication information output apparatus through the network. The apparatus includes an individual authentication section for outputting an individual authentication result of the user based on one of the first type input and the second type input from the user; a specification section for specifying at least an information processing system selected by the user among the plurality of information processing systems; a database for managing individual authentication information in association with the, individual authentication result provided by the individual authentication section and a specification result provided by the specification section and a database access section for, based on the individual authentication result provided by the individual authentication section and the specification result provided by the specification section, reading the individual authentication information associated therewith, and outputting the read individual authentication information to the selected information processing system through the network.

In one embodiment of the invention, the specification section further specifies a service selected by the user among a plurality of services provided by the information processing system selected by the user.

In one embodiment of the invention, the individual authentication information is either one of a password, biometric information and pseudo biometric information.

In one embodiment of the invention, the input from the user is biometric information representing at least one of fingerprint, face, retina, iris, handprint, voice and handwriting.

According to still another aspect of the invention, an individual authentication information output apparatus connectable to a plurality of terminals and a plurality of information processing systems through a network is provided. The plurality of terminals include a first terminal having a first input section for receiving first type individual authentication information from a user. The first type individual authentication information is provided to the individual authentication information output apparatus through the network. The apparatus includes a database for managing second type individual authentication information, which is different from the first type individual authentication information, in association with the first type individual authentication information; and a database access section for, based on the first type individual authentication information, reading the second type individual authentication information associated therewith, and outputting the read second type individual authentication information to a selected information processing system among the plurality of information processing systems through the network.

In one embodiment of the invention, each of the first type individual authentication information and the second type individual authentication information is either one of a password, biometric information and pseudo biometric information.

In one embodiment of the invention, the input from the user is biometric information representing at least one of fingerprint, face, retina, iris, handprint, voice and handwriting.

In one embodiment of the invention, the database is a medium detachable from the individual authentication information output apparatus.

Thus, the invention described herein makes possible the advantages of providing (1) an individual authentication information output apparatus for easily managing passwords without causing the user to be concerned about a great number of passwords even when there are a great number of business connections; and (2) an individual authentication information output apparatus capable of handling a plurality of individual authentication systems.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
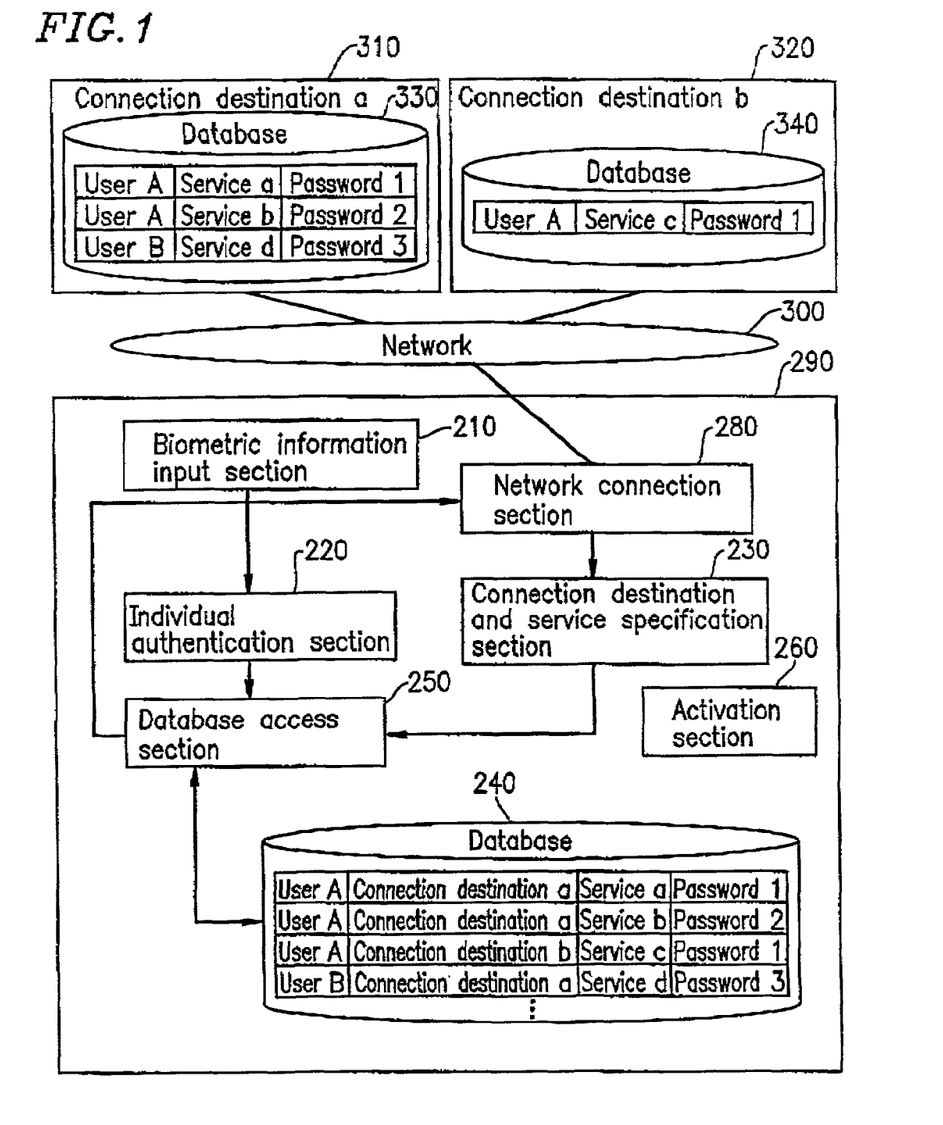
FIG. 1 is a block diagram illustrating an exemplary structure of an individual authentication information output apparatus 290 according to a first example of the present invention.

FIG. 1 shows an exemplary structure of an individual authentication information output apparatus 290 according to a first example of the present invention.

The individual authentication information output apparatus 290 is constructed to be connectable to a plurality of information processing systems through a network 300.

FIG. 1 shows, as exemplary connection destinations (i.e., the other ends of the connection) of the individual authentication information output apparatus 290, an information processing system 310 (connection destination a) and an information processing system 320 (connection destination b). The number of information processing systems which are connected to the individual authentication information output apparatus 290 is not limited to two. The individual authentication information output apparatus 290 is constructed to be connectable to any number of information processing systems through the network 300.

The connection/disconnection between the individual authentication information output apparatus 290 and each information processing system is controlled by a network connection section 280. The network 300 can be any type of network, for example, the Internet.

In this example, the information processing system 310 requests a user to input a password for each service provided by the information processing system 310. In order to determine whether the password input by the user is proper or not, the information processing system 310 has a database 330 for managing passwords in association with the users and the contents of services. In the example shown in FIG. 1, the database 330 manages a password 1 in association with a user A and a service a.

It is assumed that, for example, the user A applies to the information processing system 310 for use of the service a. Such an application is achieved by, for example, directly or indirectly inputting, to the information processing system 310, the information that the user A wants to use the service a. Then, the information processing system 310 determines whether the password input to the information processing system 310 matches the password 1 stored in the database 330 or not. When the two passwords match each other, the information processing system 310 determines that the input password is proper and permits the user A to use the service a. When the two passwords do not match each other, the information processing system 310 rejects use of the service a by the user A.

Similarly, the information processing system 320 requests the user to input a password for each service provided by the information processing system 320. The information processing system 320 has a similar structure to that of the information processing system 310 and will not be described here.

The individual authentication information output apparatus 290 includes a biometric information input section 210, an individual authentication section 220, a connection destination and service specification section 230, a database 240, and a database access section 250.

The biometric information input section 210 is used to input biometric information of the user to the individual authentication information output apparatus 290. In the case where the biometric information represents at least one of fingerprints face, retina, iris, handprint, and handwriting, an image input device such as, for example, a camera or a tablet is used as the biometric information input section 210. When the biometric information represents voice, a microphone is used as the biometric information input section 210.

The individual authentication section 220 outputs an authentication result of the user (individual authentication result) based on the biometric information of the user input by the biometric information input section 210.

The connection destination and service specification section 230 specifies the "information processing system (connection destination)" and the "service" applied by the user for use. Such specification is performed by, for example, referring to information representing the latest connection destination and information representing the latest service which are stored in the network connection section 280. Herein, the term "information processing system (connection destination)" refers to an information processing system which is selected by the user among a plurality of information processing systems connectable to the individual authentication information output apparatus 290. The term "service" refers to a service which is selected by the user among a plurality of services provided by the information processing system selected by the user. The information processing system selected by the user can be specified by, for example, the telephone number or the name of the connection destination. The service selected by the user can be specified by, for example, the amount of money involved in the transaction or the response from the connection destination.

The database 240 manages passwords in association with individual authentication results provided by the individual authentication section 220 and specification results provided by the connection destination and service specification section 230.

Based on a specific individual authentication result provided by the individual authentication section 220 and a specific specification result provided by the connection destination and service specification section 230, the database access section 250 reads the password associated with the individual authentication result and the specification result, and outputs the read password to the information processing system of the connection destination through the network 300.

Hereinafter, an operation of the individual authentication information output apparatus 290 will be described. Here, it is assumed that the user A uses the service a (product purchase service) provided by the information processing system 310 to take steps to purchase a product. In this case, the user A connects the individual authentication information output apparatus 290 to the information processing system 310 (connection destination a) and determines which product to purchase using the service a. The product to purchase can be determined by, for example, following a hierarchical menu displayed on a screen of a display section (not shown).

When the user selects to use the service a provided by the information processing system 310 in this manner, the information processing system 310 requests the individual authentication information output apparatus 290 to input the password of the user in order to check whether the user is the user A.

In response to the request from the information processing system 310, the biometric information input section 210 requests the user to input biometric information. The biometric information input section 210 receives biometric information representing, for example, his/her fingerprint from the user and outputs the biometric information to the individual authentication section 220.

In the case where the biometric information representing the fingerprint is input by the biometric information input section 210, the individual authentication section 220 outputs a signal specifying an individual having the fingerprint to the database access section 250. When, for example, the user is confirmed to be the user A, the individual authentication section 220 outputs a signal representing the "user A" to the database access section 250 as an individual authentication result.

In response to a request from the information processing system 310, the connection destination and service specification section 230 specifies the information processing system selected by the user and the service selected by the user. When, for example, the information processing system selected by the user is specified as the information processing system 310 (connection destination a) and the service selected by the user is specified as the service a, the connection destination and service specification section 230 outputs a signal representing the "connection destination a" and "service a" to the database access section 250 as a specification result.

The database access section 250 receives the signal representing the "user A" from the individual authentication section 220 and receives the signal representing the "connection destination a" and "service a" from the connection destination and service specification section 230, and reads a password associated with the "user A", "connection destination a" and "service a" (in the example shown in FIG. 1, the "password 1") from the database 240. The password read from the database 240 is sent to the information processing system 310 (connection destination a) through the network connection section 280 and the network 300.

As described above, using the individual authentication information output apparatus 290, a password corresponding to the information processing system selected by the user as a connection destination and the service selected by the user is output. Due to such a system, the user need not be concerned whether or not different passwords are set for different connection destinations and different services. Even when there are a great number of connection destinations and services, all the user needs to do is input the same biometric information to the biometric information input section 210. Thus, even when there are a great number of connection destinations and services, all the passwords can be handled comprehensively without causing the user to be concerned about a great number of passwords.

The individual authentication information output apparatus 290 can perform individual authentication without relying on the individual authentication system of the information processing system of the connection destination. Therefore, even when the information processing system of the connection destination keeps on using a conventional individual authentication system (for example, a password-based individual authentication system), a highly reliable individual authentication system can be introduced without changing the information processing system of the connection destination.

In the above example, the information input to the individual authentication section 220 is biometric information. One advantage of using biometric information for individual authentication is that the biometric information provides a higher level of reliability than a password (character or symbol code string). Accordingly, use of biometric information is suitable for transactions involving a large amount of money. Another advantage of using biometric information for individual authentication is that the biometric information has a lower level risk of being stolen or misused than a password. Accordingly, use of biometric information is suitable for transactions performed in public.

It should be noted, however, that information input to the individual authentication section 220 is not limited to biometric information. Information input to the individual authentication section 220 can be any type of information usable for individual authentication. For example, a password (character or symbol code string) can be input instead of the biometric information. Instead of the biometric information input section 210, any type of input section for receiving information which is input by the user can be used.

In the above example, the connection destination and service specification section 230 specifies both (i) an information processing system selected by the user among a plurality of information processing systems connectable to the individual authentication information output apparatus 290 and (ii) a service selected by the user among a plurality of services provided by the information processing system selected by the user. The present invention is not limited to this. In the case where, for example, one same password is set in one information processing system for all the services provided by the information processing system, the connection destination and service specification section 230 need only specify an information processing system selected by the user among a plurality of information processing systems connectable to the individual authentication information output apparatus 290. In this manner, the connection destination and service specification section 230 can act as a section for specifying at least an information processing system selected by the user among a plurality of information processing systems connectable to the individual authentication information output apparatus 290.

In the above example, the information read from the database 240 by the database access section 250 is a password (character or symbol code string). The present invention is not limited to this. The information which is read from the database 240 by the database access section 250 can be any type of individual authentication information usable for individual authentication. The individual authentication information can be, for example, biometric information (code string) obtained as an output of the biometric information input section 210 or pseudo biometric information (code string) having the same format as that of the biometric information. Herein, the term "pseudo biometric information" refers to information artificially produced so as to be similar to biometric information.

The individual authentication information output apparatus 290 can be set to be constantly operating or to be started only when an information processing system of a connection destination requests for individual authentication. An activation section 260 activates the individual authentication information output apparatus 290 when necessary. In this manner, the power consumption of the individual authentication information output apparatus 290 can be reduced.

The connection destination and service specification section 230 can obtain information used for specifying the connection destination and service from databases other than the network connection section 280 (for example, an address directory).

At least one of information stored in the database 240, information to be input to the database 240 and information to be output from the database 240 can be encrypted.

EXAMPLE 2

Figure 2:
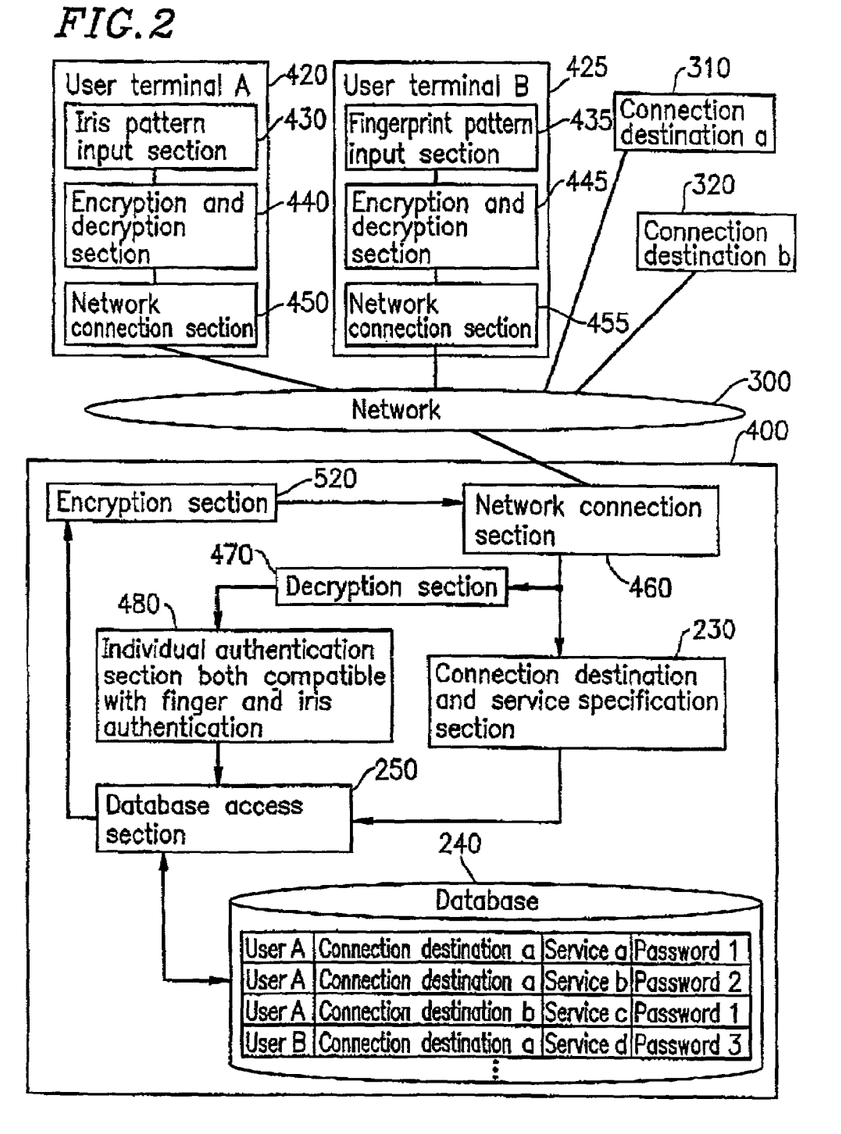
FIG. 2 is a block diagram illustrating an exemplary structure of an individual authentication information output apparatus 400 according to a second example of the present invention.

FIG. 2 shows an exemplary structure of an individual authentication information output apparatus 400 according to a second example of the present invention.

The individual authentication information output apparatus 400 is constructed to be connectable to a plurality of information processing systems including an information processing system 310 (connection destination a) and an information processing system 320 (connection destination b) through a network 300, as in the first example.

The individual authentication information output apparatus 400 is constructed to be connectable also to a plurality of terminals through the network 300.

FIG. 2 shows a terminal 420 (user terminal A) as an exemplary terminal having a function of receiving biometric information representing an iris, and a terminal 425 (user terminal B) as an exemplary terminal having a function of receiving biometric information representing a fingerprint.

The terminal 420 includes an iris pattern input section 430 for receiving an iris pattern of a user, an encryption and decryption section 440 for encrypting the iris pattern, and a network connection section 450 for sending the encrypted iris pattern to the individual authentication information output apparatus 400 through the network 300. Herein, the term "iris pattern" refers to biometric information (code string) representing an iris of a user.

The terminal 425 includes a fingerprint pattern input section 435 for receiving a fingerprint pattern of a user, an encryption and decryption section 445 for encrypting the fingerprint pattern, and a network connection section 455 for sending the encrypted fingerprint pattern to the individual authentication information output apparatus 400 through the network 300. Herein, the term "fingerprint pattern" refers to biometric information (code string) representing a fingerprint of a user.

The individual authentication information output apparatus 400 includes an individual authentication section 480 both compatible with fingerprint and iris authentication, a connection destination and service specification section 230, a database 240, and a database access section 250.

The individual authentication section 480 has a function of outputting an individual authentication result based on a fingerprint pattern and a function of outputting an individual authentication result based on an iris pattern.

Regarding FIG. 2, identical elements previously discussed with respect to FIG. 1 bear identical reference numerals and the detailed descriptions thereof will be omitted.

Hereinafter, an operation of the individual authentication information output apparatus 400 will be described. Here, it is assumed that the user A operating the terminal 420 uses the service a (product purchase service) provided by the information processing system 310 to take steps to purchase a product. In this case, the user A connect B the terminal 420 to the information processing system 310 (connection destination a) and determines which product to purchase using the service a. The product to purchase can be determined by, for example, following a hierarchical menu displayed on a screen of a display section (not shown) of the terminal 420.

When the user selects to use the service a provided by the information processing system 310 using the terminal 420, the information processing system 310 requests the terminal 420 to input the individual authentication information of the user in order to check whether the user is the user A.

In response to the request from the information processing system 310, the iris pattern input section 430 requests the user to input an iris pattern. The iris pattern which is input to the iris pattern input section 430 is then encrypted by the encryption and decryption section 440. The encrypted iris pattern is sent to the individual authentication information output apparatus 400 by the network connection section 450.

A decryption section 470 included in the individual authentication information output apparatus 400 receives the encrypted iris pattern sent by the network connection section 450 through a network connection section 460 included in the individual authentication information output apparatus 400 and decrypts the encrypted iris pattern so as to generate an iris pattern. The generated iris pattern is output to the individual authentication section 480.

When receiving the iris pattern from the decryption section 470, the individual authentication section 480 executes individual authentication processing based on the iris pattern and outputs a signal specifying an individual having the iris pattern to the database access section 250. When, for example, the user is confirmed to be the user A, the individual authentication section 480 outputs a signal representing the "user A" to the database access section 250 as an individual authentication result.

The connection destination and service specification section 230, the database 240 and the database access section 250 operate as described in the first example.

The database access section 250 reads the password associated with the "user A", "connection destination a" and "service a" (in the example shown in FIG. 2, a "password 1") from the database 240, and outputs the read password to an encryption section 520 included in the individual authentication information output apparatus 400.

The encryption section 520 encrypts the password and outputs the encrypted password to the network connection section 460.

The network connection section 460 sends the encrypted password to the terminal 420 through the network 300.

The encryption and decryption section 440 in the terminal 420 decrypts the encrypted password to generate a password. The generated password is sent to the information processing system 310 (connection destination a).

Similarly, when the user selects to use the service a provided by the information processing system 310 using the terminal 425, the information processing system 310 requests the terminal 425 to input the individual authentication information of the user in order to check whether the user is the user A.

In response to the request from the information processing system 310, the fingerprint pattern input section 435 requests the user to input a fingerprint pattern.

The fingerprint pattern which is input to the fingerprint pattern input section 435 is encrypted by the encryption and decryption section 445. The encrypted fingerprint pattern is sent to the individual authentication information output apparatus 400 by the network connection section 455.

The decryption section 470 receives the encrypted fingerprint pattern sent by the network connection section 455 through the network connection section 460 and decrypts the encrypted fingerprint pattern so as to generate a fingerprint pattern. The generated fingerprint pattern is output to the individual authentication section 480.

When receiving the fingerprint pattern from the decryption section 470, the individual authentication section 480 executes individual authentication processing based on the fingerprint pattern and outputs a signal specifying an individual having the fingerprint pattern to the database access section 250. When, for example, the user is confirmed to be the user A, the individual authentication section 480 outputs a signal representing the "user A" to the database access section 250 as an individual authentication result.

The connection destination and service specification section 230, the database 240 and the database access section 250 operate as described in the first example.

As described above, using the individual authentication information output apparatus 400, a password corresponding to the information processing system selected by the user as a connection destination and the service selected by the user is output. Due to such a system, the user need not be concerned whether or not different passwords are set for different connection destinations and different services. Even when there are a great number of connection destinations and services, all the user needs to do is input the same biometric information. Thus, even when there are a great number of connection destinations and services, all the passwords can be managed comprehensively without causing the user to be concerned about a great number of passwords.

The individual authentication information output apparatus 400 can perform individual authentication without relying on the individual authentication system of the information processing system of the connection destination. Therefore, even when the information processing system of the connection destination keeps on using a conventional individual authentication system (for example, a password-based individual authentication system), a highly reliable individual authentication system can be introduced without changing the information processing system of the connection destination.

The individual authentication information output apparatus 400 includes the individual authentication section 480 capable of handling both fingerprint patterns and iris patterns. Therefore, the individual authentication information output apparatus 400 can handle both an iris pattern-based individual authentication system and a fingerprint pattern-based individual authentication system. Since a plurality of individual authentication systems can be handled, the user can select an individual authentication system which is convenient to the user. In the case where, for example, the user is frequently incorrectly recognized as not being the user himself/herself, the user can select an individual authentication system which is more convenient to the user. In the case where one individual authentication system is not convenient to a handicapped user, the handicapped user can use a different individual authentication system. (For example, a user who cannot use a fingerprint due to the loss of fingers can use an iris pattern-based individual authentication system.)

In the above example, the information input to the individual authentication section 480 is a fingerprint pattern or an iris pattern. The present invention is not limited to this. In the case where the individual authentication section 480 has a function of outputting individual authentication results based on N different types of patterns, the individual authentication section 480 can be set to receive N different types of patterns, where N is an arbitrary integer of two or more. The N different types of patterns can each be any pattern usable for individual authentication. The N different types of patterns can each be biometric information or non-biometric information. In the case where, for example, the individual authentication section 480 has a function of outputting an individual authentication result based on a password (character or symbol code string), the individual authentication section 480 can be set to receive passwords (character or symbol code strings). As biometric information, information which represents at least one of fingerprint, face, retina, iris, handprint, voice and handwriting is usable.

The individual authentication information output apparatus 400 can be administered by an information distribution service provider (e.g. a company involved in service providing business) or the user himself/herself.

In the above example, the iris pattern sent from the terminal 420 to the individual authentication information output apparatus 400 and the fingerprint pattern sent from the terminal 425 to the individual authentication information output apparatus 400 are both encrypted, and the password sent from the individual authentication information output apparatus 400 to the information processing system 310 is encrypted. However, such information need not necessarily be encrypted. In the case where the information is sent without being encrypted, neither the encryption section nor the decryption section is necessary.

Figure 3:
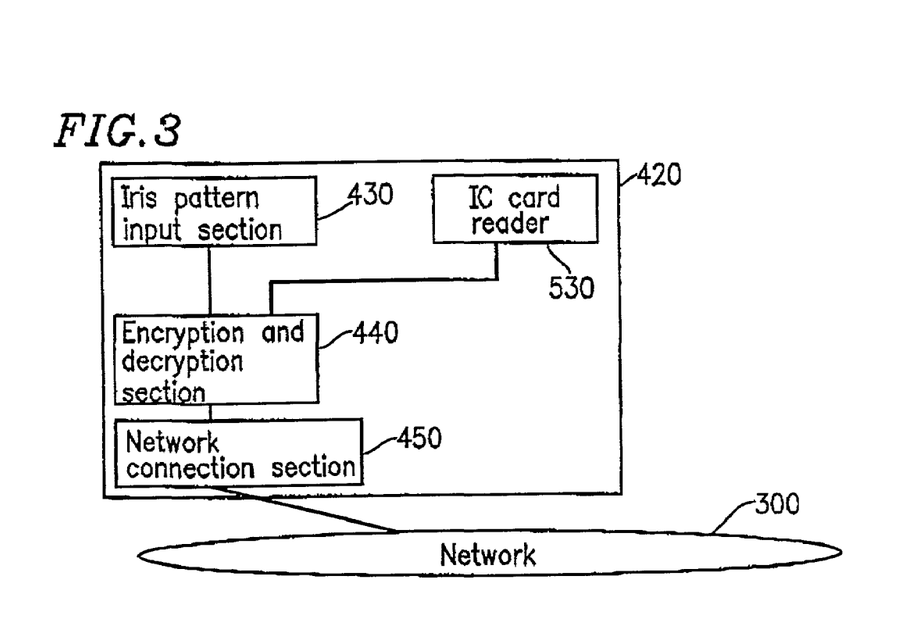
FIG. 3 is a block diagram illustrating another exemplary structure of a terminal 420.

FIG. 3 shows another exemplary structure of the terminal 420.

The terminal 420 shown in FIG. 3 further includes an IC card reader 530. When the user inserts an IC card into the IC card reader 530, authentication information stored on the IC card is sent to the individual authentication information output apparatus 400 together with an iris pattern.

The individual authentication section 480 (FIG. 2) executes individual authentication based on the iris pattern and the authentication information stored on the IC card. By combining individual authentication based on biometric information and individual authentication based biometric information, there liability of individual authentication can be further improved.

The individual authentication based on the authentication information stored on the IC card need not necessarily be performed within the individual authentication information output apparatus 400. Such individual authentication can be performed in another apparatus (administered by a different business) connected to the network 300.

Figure 4:
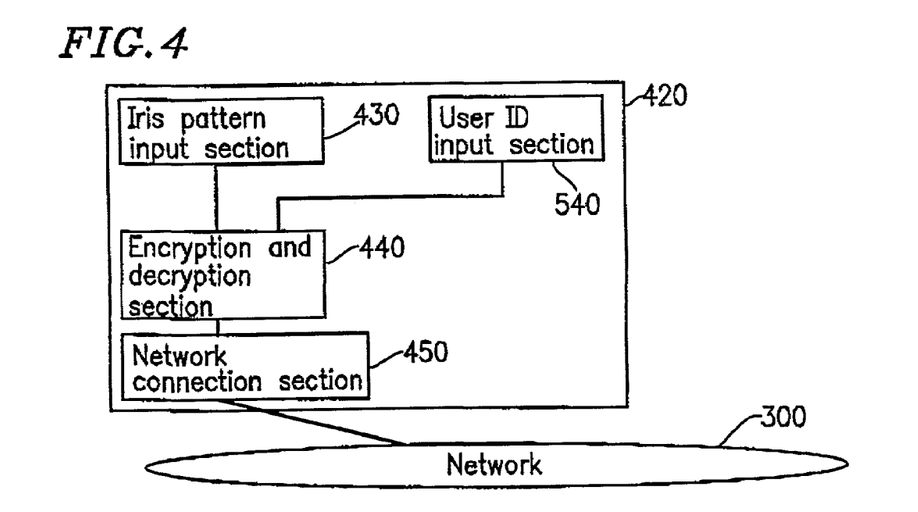
FIG. 4 is a block diagram illustrating still another exemplary structure of the terminal 420.

FIG. 4 shows still another exemplary structure of the terminal 420.

The terminal 420 shown in FIG. 4 further includes a user IC input section 540. The user IC input section 540 is used by the user to input a user ID to the terminal 420. As the user ID, a user name or a user nickname, for example, is usable. The user ID is sent to the individual authentication information output apparatus 400 together with an iris pattern.

The individual authentication section 480 (FIG. 2) executes individual authentication by determining whether or not the iris pattern sent from the terminal 420 matches an iris pattern corresponding to the user ID sent from the terminal 420. Due to such a system, the individual authentication section 480 need not find a user corresponding to the iris pattern sent from the terminal 420 from among all the users in a database for each authentication. Therefore, the time period required by the individual authentication section 480 for individual authentication processing can be significantly reduced.

The user ID can be input to the terminal 420 using a keyboard of the terminal 420. Alternatively, voice which is input from a microphone can be converted into a user ID using a voice recognition section.

A user ID can be an ID inherent to the terminal, or a combination of information inherent to a user, such as a user name or the like, and an ID inherent to a terminal. An ID which is inherent to a terminal can be, for example, a telephone number (when the terminal is a cellular phone) or an IP address.

Figure 5:
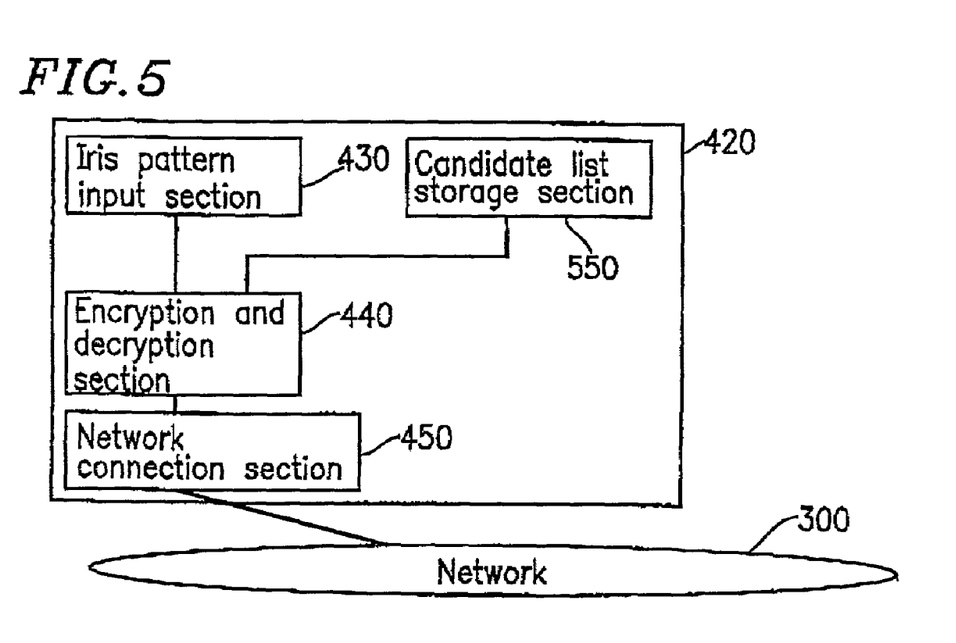
FIG. 5 is a block diagram illustrating still another exemplary structure of the terminal 420.

FIG. 5 shows still another exemplary structure of the terminal 420.

The structure of the terminal 420 shown in FIG. 5 is effective when individuals who can use the terminal 420 are limited.

The terminal 420 shown in FIG. 5 further includes a candidate list storage section 550. The candidate list storage section 550 stores a list of user IDs (candidate list) of the individuals who can use the terminal 420. The candidate list is prepared in advance by the owner of the terminal 420. The candidate list is sent to the individual authentication information output apparatus 400 together with an iris pattern.

The individual authentication section 480 executes individual authentication by determining whether or not the iris pattern sent from the terminal 420 matches an iris pattern corresponding to the user ID in the candidate list sent from the terminal 420. Due to such a system, the individual authentication section 480 need not find a user corresponding to the iris pattern sent from the terminal 420 from among all the users in a database for each authentication. Therefore, the time period required by the individual authentication section 480 for individual authentication processing can be significantly reduced.

The structure of the terminal 425 shown in FIG. 2 can be changed so as to have a structure shown in either one of the structures shown in FIGS. 3 through 5.

EXAMPLE 3

Figure 6:
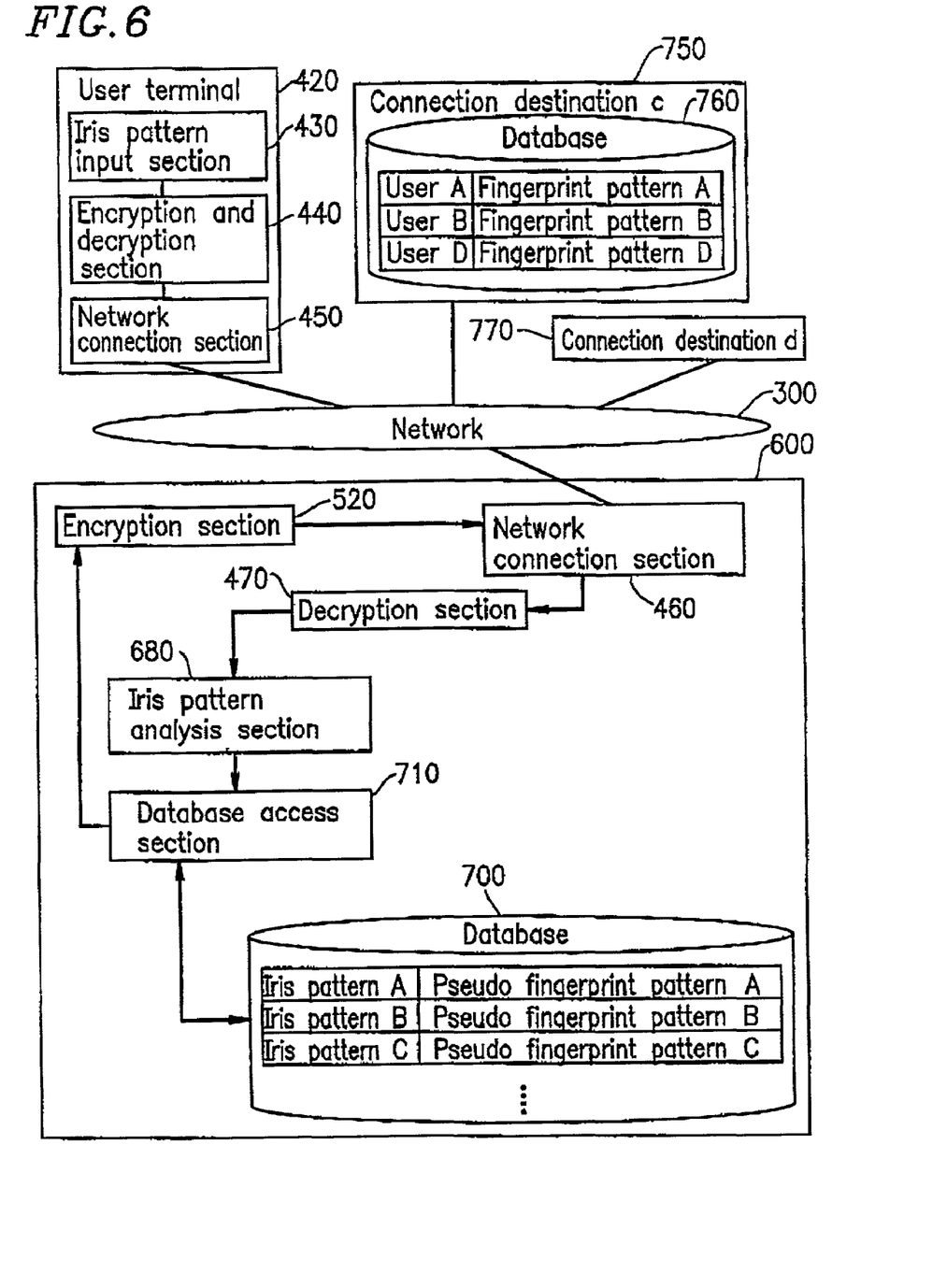
FIG. 6 is a block diagram illustrating an exemplary structure of an individual authentication information output apparatus 600 according to a third example of the present invention.

FIG. 6 shows an exemplary structure of an individual authentication information output apparatus 600 according to a third example of the present invention.

The individual authentication information output apparatus 600 is constructed to be connectable to a plurality of information processing systems including an information processing system 750 (connection destination a) and an information processing system 770 (connection destination d) through a network 300.

In this example, the information processing system 750 requires a user to input a finger print pattern. In order to determine whether the fingerprint pattern input by the user is proper or not, the information processing system 750 has a database 760 for managing fingerprints in association with the users in the example shown in FIG. 6, the database 760 manages a fingerprint A in association with a user A.

It is assumed that, for example, the user A applies for use of the information processing system 750. Such an application is achieved by, for example, directly or indirectly inputting, to the information processing system 750, the information that the user A wants to use the information processing system 750. Then, the information processing system 750 determines whether or not the fingerprint input to the information processing system 750 matches the fingerprint stored in the database 760. When the two fingerprints match each other, the information processing system 750 determines that the input fingerprint is proper and permits the user A to use the information processing system 750. When the two fingerprints do not match each other, the information processing system 750 rejects use of the information processing system 750 by the user A.

Similarly, the information processing system 770 requests the user to input a fingerprint. The information processing system 770 has a similar structure to that of the information processing system 750 and will not be described here.

The individual authentication information output apparatus 600 is constructed to be connectable also to a plurality of terminals including the terminal 420 through the network 300.

The individual authentication information output apparatus 600 includes an iris pattern analysis section 680, a database 700, and a data access section 710.

Regarding FIG. 6, identical elements previously discussed with respect to FIG. 2 bear identical reference numerals and the detailed descriptions thereof will be omitted.

Hereinafter, an operation of the individual authentication information output apparatus 600 will be described. Here, it is assumed that the user A uses a service provided by the information processing system 750 to take steps to purchase a product. In this case, the user A connects the terminal 420 to the information processing system 750 (connection destination a) and determines which product to purchase using the product purchase service. The product to purchase can be determined by, for example, following a hierarchical menu displayed on a screen of a display section (not shown) of the terminal 420.

When the user selects to use the information processing system 750 using the terminal 420, the information processing system 750 requests the terminal 420 to input individual authentication information in order to check whether the user is the user A.

In response to the request from the information processing system 750, the iris pattern input section 430 requests the user to input an iris pattern (image data). The iris pattern which is input to the iris pattern input section 430 is encrypted by the encryption and decryption section 440. The encrypted iris pattern is sent to the individual authentication information output apparatus 600 by the network connection section 450.

A decryption section 470 included in the individual authentication information output apparatus 600 receives the encrypted iris pattern sent by the network connection section 450 through a network connection section 460 included in the individual authentication information output apparatus 600, and decrypts the encrypted iris pattern so as to generate an iris pattern. The generated iris pattern is output to an iris pattern analysis section 680.

The iris pattern analysis section 680 analyzes the iris pattern (image data) and outputs an iris pattern (bit string comprising "0" and "1") as the analysis result.

The database 700 manages pseudo fingerprint patterns in association with iris patterns (bit string comprising "0"s and "1"s). Herein, the term "pseudo fingerprint pattern" refers to a pattern having the same format as that of a fingerprint pattern (bit string comprising "0" s and "1" s).

The database access section 710 determines whether or not the iris pattern (bit string comprising "0" s and "1" s) output from the iris pattern analysis section 680 as the analysis result matches the iris pattern (bit string comprising "0" s and "1" s) stored in the database 700. Only when the two iris patterns match each other, does the database access section 710 read a pseudo fingerprint pattern corresponding to the iris pattern from the database 700, and output the read pseudo fingerprint pattern to an encryption section 520.

The encryption section 520 encrypts the pseudo fingerprint pattern and outputs the encrypted pseudo fingerprint pattern to the network connection section 460.

The network connection section 460 sends the encrypted pseudo fingerprint pattern to the terminal 420 through the network 300.

The encryption and decryption section 440 of the terminal 420 decrypts the encrypted pseudo fingerprint pattern to generate a pseudo fingerprint pattern. The generated pseudo fingerprint pattern is sent to the information processing system 750 (connection destination c).

As described above, the individual authentication information output apparatus 600 has a function of converting a first type individual authentication information (for example, iris pattern) which is input thereto to a second type individual authentication information (for example, pseudo fingerprint pattern), which is different from the first type individual authentication information, and outputting the second type individual authentication information to the information processing system of the connection destination. Due to such a system, a user interface can be provided for adopting an individual authentication system based on the first type individual authentication information for an information processing system which adopts an individual authentication system based on the second type individual authentication information. As a result, the user can select an individual authentication system which is convenient to the user. For example, a handicapped individual who cannot use a fingerprint due to the loss of fingers can input an iris pattern. The iris pattern is converted into a pseudo fingerprint pattern (pattern identical to the fingerprint in a pseudo manner). Thus, an information processing system adopting an individual authentication system based on a fingerprint pattern is usable.

Since the individual authentication information output apparatus 600 converts the individual authentication information, it is not necessary that one terminal has a plurality of individual authentication systems mounted thereon, that a user carry a plurality of terminals, or the structure of the information processing system 750 is changed.

As described above, each of the first type individual authentication information and the second type individual authentication information can be any type of individual authentication information usable for individual authentication. For example, each of the first type individual authentication information and the second type individual authentication information can be biometric information (code string), pseudo biometric information (code string), or a password (character or symbol code string). The biometric information can be information representing at least one of fingerprint, face, retina, iris, handprint, voice and handwriting.

The terminal 420 can include, instead of the iris pattern analysis section 430, a biometric information input section for receiving biometric information other than an iris pattern (for example, biometric information representing fingerprint, face, retina, handprint, voice or handwriting). The individual authentication information output apparatus 600 can include, instead of the iris pattern analysis section 680, an analysis section corresponding to the biometric information input section.

Instead of the pseudo fingerprint patterns, the database 700 can store pseudo biometric information other than the fingerprint patterns (for example, biometric information representing face, retina, iris, handprint, voice or handwriting). Instead of the pseudo biometric information, the database 700 can store passwords or biometric information.

The database 700 can associate one user with a plurality of types of biometric information (or pseudo biometric information), so that one biometric feature can be used for various information processing systems using the individual authentication information output apparatus 600.

In the above example, the arts pattern sent from the terminal 420 to the individual authentication information output apparatus 600 is encrypted, and the pseudo fingerprint pattern sent from the individual authentication information output apparatus 600 to the information processing system 750 is encrypted. However, such information need not necessarily be encrypted. In the case where the information is sent without being encrypted, neither the encryption section nor the decryption section is necessary.

At least one of information stored in the database 700, information to be input to the database 700 and information to be output from the database 700 can be encrypted.

In the above example, the database 700 does not associate the pseudo fingerprint patterns in association with the connection destinations and the contents of services. However, as in the first and second examples, the database 700 can associate the pseudo fingerprint patterns in association with the connection destinations and the contents of services.

Figure 7:
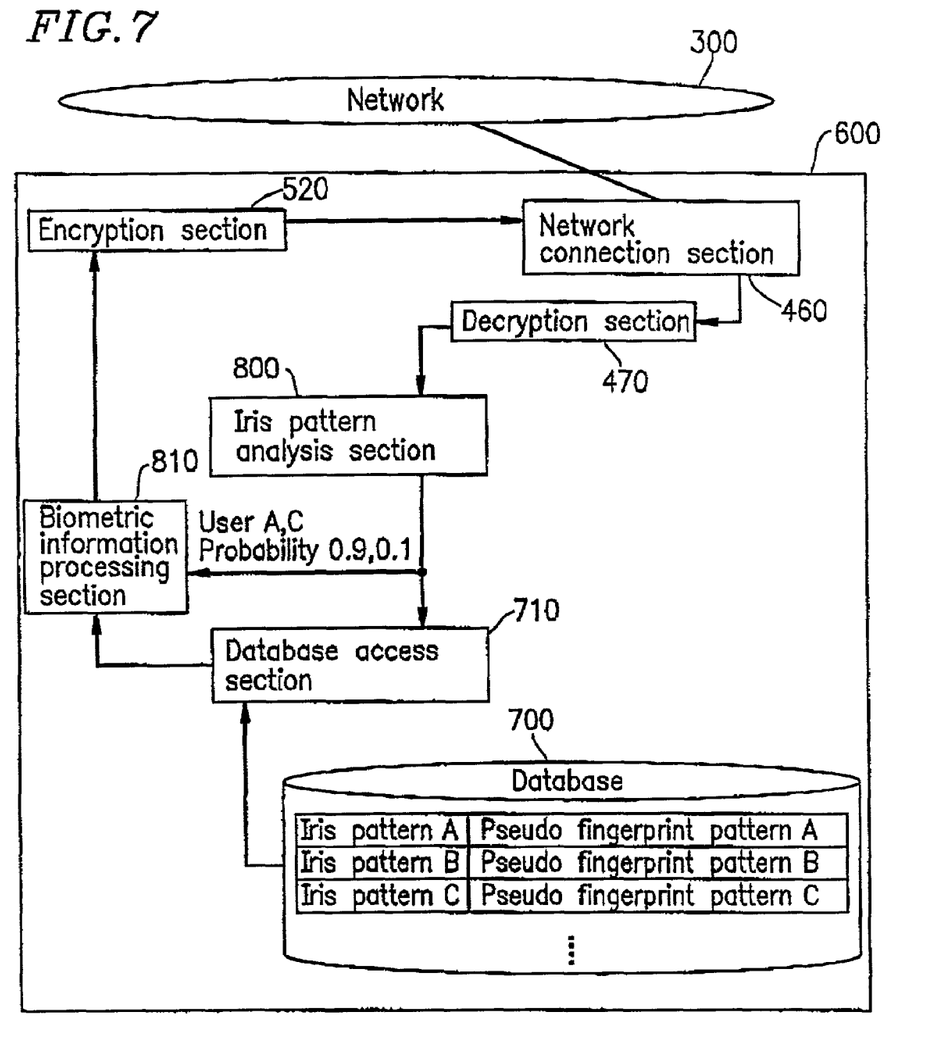
FIG. 7 is a block diagram illustrating another exemplary structure of the individual authentication information output apparatus 600.

FIG. 7 shows another exemplary structure of the individual authentication information output apparatus 600.

Regarding FIG. 7, identical elements previously discussed with respect to FIG. 6 bear identical reference numerals and the detailed descriptions thereof will be omitted.

An iris pattern analysis section 800 receives an iris pattern from the decryption section 470 and analyzes the iris pattern. Thus, the iris pattern analysis section 800 outputs, as an analysis result of the iris pattern, information representing candidates for the user and information representing the probability which shows how probable that each candidate is the user, to a biometric information processing section 810. In the case where, for is example, the probability that the user is the user A is 0.9, the probability that the user is the user B is 0, and the probability that the user is the user C is 0.1, the iris pattern analysis section 800 outputs information representing candidates for the user (i.e., user A, user C), and information representing the probability (i.e., 0.9, 0.1) to the biometric information processing section 810.

The biometric information processing section 810 uses the information representing the probability which is output from the iris pattern analysis section 800 to process the pseudo biometric information which is output from the database access section 710. For example, the biometric information processing section 810 synthesizes a pattern corresponding to 90% of the pseudo fingerprint of the user A and a pattern corresponding to 10% of the pseudo fingerprint of the user C to generate a new pseudo fingerprint pattern. The pseudo biometric information obtained as a result of processing performed by the biometric information processing section 810 in this manner is output to the encryption section 520.

Unlike a password, biometric information changes each time it is obtained. For example, a fingerprint pattern changes each time it is obtained by a sensor. By processing the pseudo fingerprint pattern in accordance with the analysis result of the biometric information as described above with reference to FIG. 7, the change in the fingerprint pattern can be simulated. As a result, a fingerprint pattern closer to an actual fingerprint can be input to the information processing system.

Figure 8:
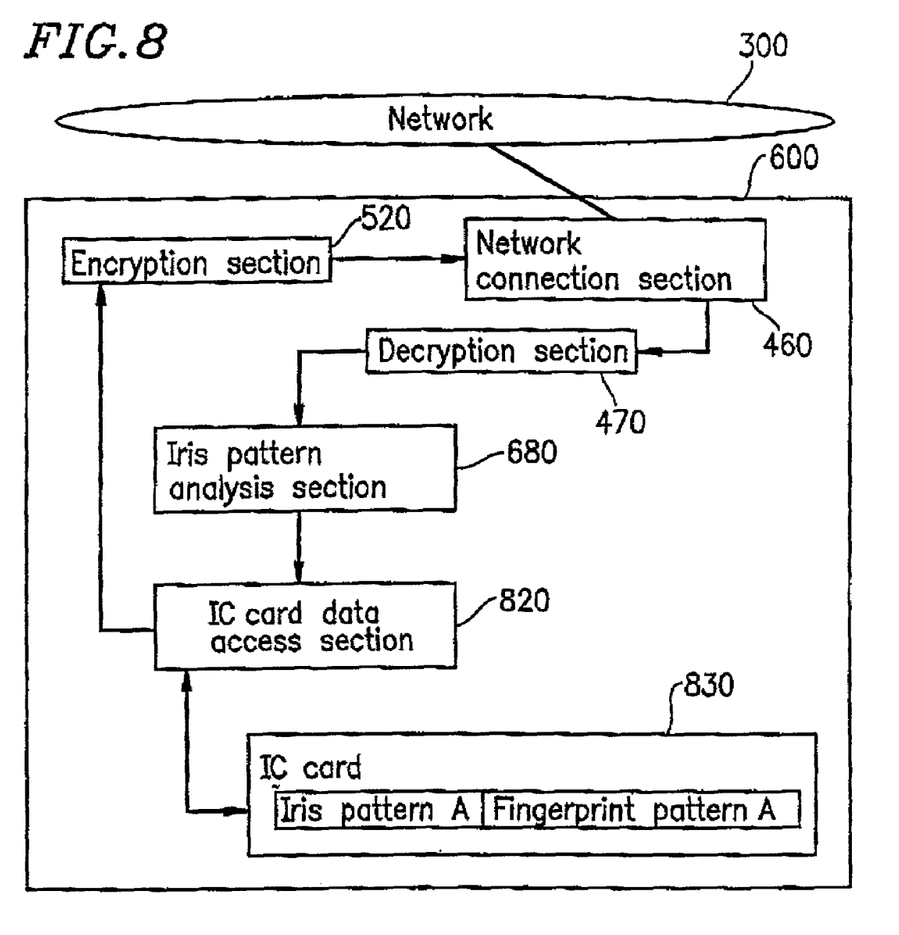
FIG. 8 is a block diagram illustrating still another exemplary structure of the individual authentication information output apparatus 600.

FIG. 8 shows still another exemplary structure of the individual authentication information output apparatus 600.

The individual authentication information output apparatus 600 shown in FIG. 8 is constructed so that an IC card 830 can be inserted thereto. The IC card 830 stores an iris pattern (bit string comprising "0"s and "1"s) and a fingerprint pattern (bit string comprising "0"s and "1"s) as a pair. When the IC card 30 is inserted into the individual authentication information output apparatus 600, an IC card data access section 820 determines whether or not the iris pattern (bit string comprising "0"s and "1"s) which is output from the iris pattern analysis section 680 as the analysts result matches the iris pattern (bit string comprising "0"s and "1"s) stored on the IC card 830. Only when the two iris patterns match each other, does the IC card data access section 820 read the fingerprint pattern corresponding to the iris pattern from the IC card 830, and output the fingerprint pattern from the encryption section 520.

By constructing a database of a detachable medium such as an IC card, a memory or the like, the individual authentication information output apparatus can be usable by a great number of users.

According to the present invention, individual authentication information (for example, a password) at least corresponding to an information processing system selected by a user as a connection destination is output. Therefore, the user need not be concerned about whether or not different individual authentication information (for example, different passwords) is set by different information processing Systems of different connection destinations. Even when there are a great number of information processing systems of connection destinations, all the user needs to do is input the same input. Thus, even when there are a great number of information processing systems of connection destinations, all the types of individual authentication information (e.g., passwords) can be managed comprehensively without causing the user to be concerned about a great number of types of individual authentication information (e.g., passwords).

According to the present invention, individual authentication can be performed by the individual authentication information output apparatus without relying on the individual authentication system of the information processing system of the connection destination. Therefore, even when the information processing system of the connection destination keeps on using a conventional individual authentication system (for example, a password-based individual authentication system), a highly reliable individual authentication system can be introduced without changing the information processing system of the connection destination.

According to the present invention, an individual authentication section capable of handling both a first type input (e.g., fingerprint patterns) and a second type input (e.g., iris patterns) is provided. Therefore, both an individual authentication system based on the first type input and an individual authentication system based on the second type input can be handled. Since a plurality of individual authentication systems can be handled, the user can select an individual authentication system which is convenient to the user.

According to the present invention, the first type individual authentication information (e.g., iris pattern) which is input is converted into a second type individual authentication information (e.g., pseudo fingerprint pattern) which is different from the first type individual authentication information, and the second type individual authentication information is output to the information processing system of the connection destination. Therefore, a user interface can be provided for adopting an individual authentication system based on the first type individual authentication information for an information processing system which adopts an individual authentication system based on the second type individual authentication information. As a result, the user can select an individual authentication system which is convenient to the user.

Various other modifications will be apparent to and can be readily made by those skilled-in the art without departing from the scope and spirit of this invention. Accordingly, it is not intended that the scope of the claims appended hereto be limited to the description as set forth herein, but rather that the claims be broadly construed.

What is claimed is:

1. An individual authentication information output apparatus connectable to a terminal apparatus and a plurality of information processing systems through a network, the terminal apparatus receives from a user an individual authentication information comprising a user biometric information corresponding to a unique first human characteristic of the user, and sends the individual authentication information to the individual authentication information output apparatus through the network, the individual authentication information output apparatus comprising:

a section for receiving the user biometric information from the terminal apparatus; and a database access section operative to access, based on the received user biometric information, a database for managing a plurality of such user biometric information and a plurality of pseudo biometric information, each of the plurality of pseudo biometric information corresponding to a unique second human characteristic associated with the user and different from the first human characteristic, wherein each of the plurality of user biometric information is associated in the database with a respective one of the plurality of pseudo biometric information, said database access section operative to read the pseudo biometric information associated with the received user biometric information and to output the read pseudo biometric information as the individual authentication information to an information processing system selected among the plurality of information processing systems through the network.

2. An individual authentication information output apparatus according to claim 1, wherein the user biometric information is information for representing at least one of fingerprint, face, retina, iris, handprint, voice and handwriting.

3. An individual authentication information output apparatus according to claim 1, wherein the pseudo biometric information is information for representing at least one of fingerprint, face, retina, iris, handprint, voice and handwriting.

4. An individual authentication information output apparatus according to claim 1, wherein the pseudo biometric information is coded in a same format as the user biometric information.

5. An individual authentication information output apparatus according to claim 1, wherein the database manages by matching each of the plurality of pseudo biometric information to a corresponding one of the user biometric information.

6. An individual authentication information output apparatus according to claim 1, comprising an analyzing section for determining a matching degree of the biometric information received from the user by the terminal apparatus and outputting information indicating a user candidate based on the determined result and information indicating a probability degree representing a probability of matching each user; and a biometric information processing section for processing the pseudo biometric information read from the database into a new pseudo biometric information by using information output from the analyzing section.

7. An individual authentication information output apparatus according to claim 1, wherein the database is a machine readable medium detachable with respect to the individual authentication information output apparatus.

8. An individual authentication information output apparatus connectable to a plurality of information processing systems through a network, the individual authentication information output apparatus comprising:

a section for receiving a user biometric information corresponding to a unique first human characteristic of the user as an individual authentication information and a database access section operative to access, based on the received user biometric information, a database for managing a plurality of such user biometric information and a plurality of pseudo biometric information corresponding to a unique second human characteristic associated with the user different from the first human characteristic, wherein each of the plurality of user biometric information is associated in the database with a corresponding one of the plurality of pseudo biometric information, said database access section operative to read the pseudo biometric information associated with the received user biometric information and to output the read pseudo biometric information as the individual authentication information to an information processing system selected among the plurality of information processing systems through the network.

9. An individual authentication information output apparatus according to claim 8, wherein the user biometric information is information for representing at least one of fingerprint, face, retina, iris, handprint, voice and handwriting.

10. An individual authentication information output apparatus according to claim 8, wherein the pseudo biometric information is information for representing at least one of fingerprint, face, retina, iris, handprint, voice and handwriting.

11. An individual authentication information output apparatus according to claim 8, wherein the pseudo biometric information is coded in a same format as the user biometric information.

12. An individual authentication information output apparatus according to claim 8, wherein the database manages by matching each of the plurality of pseudo biometric information to a corresponding one of the user biometric information.

13. An individual authentication information output apparatus according to claim 8, comprising an analyzing section for determining a matching degree of the biometric information received from the user by the terminal apparatus and outputting information indicating a user candidate based on the determined result and information indicating a probability degree representing a probability of matching each user; and a biometric information processing section for processing the pseudo biometric information read from the database into a new pseudo biometric information by using information output from the analyzing section.

14. An individual authentication information output apparatus according to claim 8, wherein the database is a machine readable medium detachable with respect to the individual authentication information output apparatus.

15. An individual authentication information output apparatus connectable to a plurality of information processing systems through a network, the individual authentication information output apparatus comprising:
   a section operative to receive a user biometric information corresponding to a unique first human characteristic of the user as an individual authentication information;
   an individual authentication section operative to determine if there is any biometric information that matches the received user biometric information;
   a database for managing a plurality of such user biometric information and a plurality of pseudo biometric information, said pseudo biometric information corresponding to a unique second human characteristic associated with the user different from the first human characteristic, wherein each of the plurality of user biometric information is associated in the database with a corresponding one of the plurality of the pseudo biometric information; and
   a database access section, wherein when if the individual authentication section determines that there is a match between the received user biometric information and one of the plurality of user biometric information stored in the database the database access section converts the received user biometric information to the corresponding pseudo biometric information and outputs the pseudo biometric information as the individual authentication information to an information processing system selected among the plurality of information processing systems through the network.

* * * * *